Dec. 8, 1953  J. WILENTCHIK  2,662,147
VARIFUNCTION POTENTIOMETER
Filed Aug. 24, 1950  2 Sheets-Sheet 1
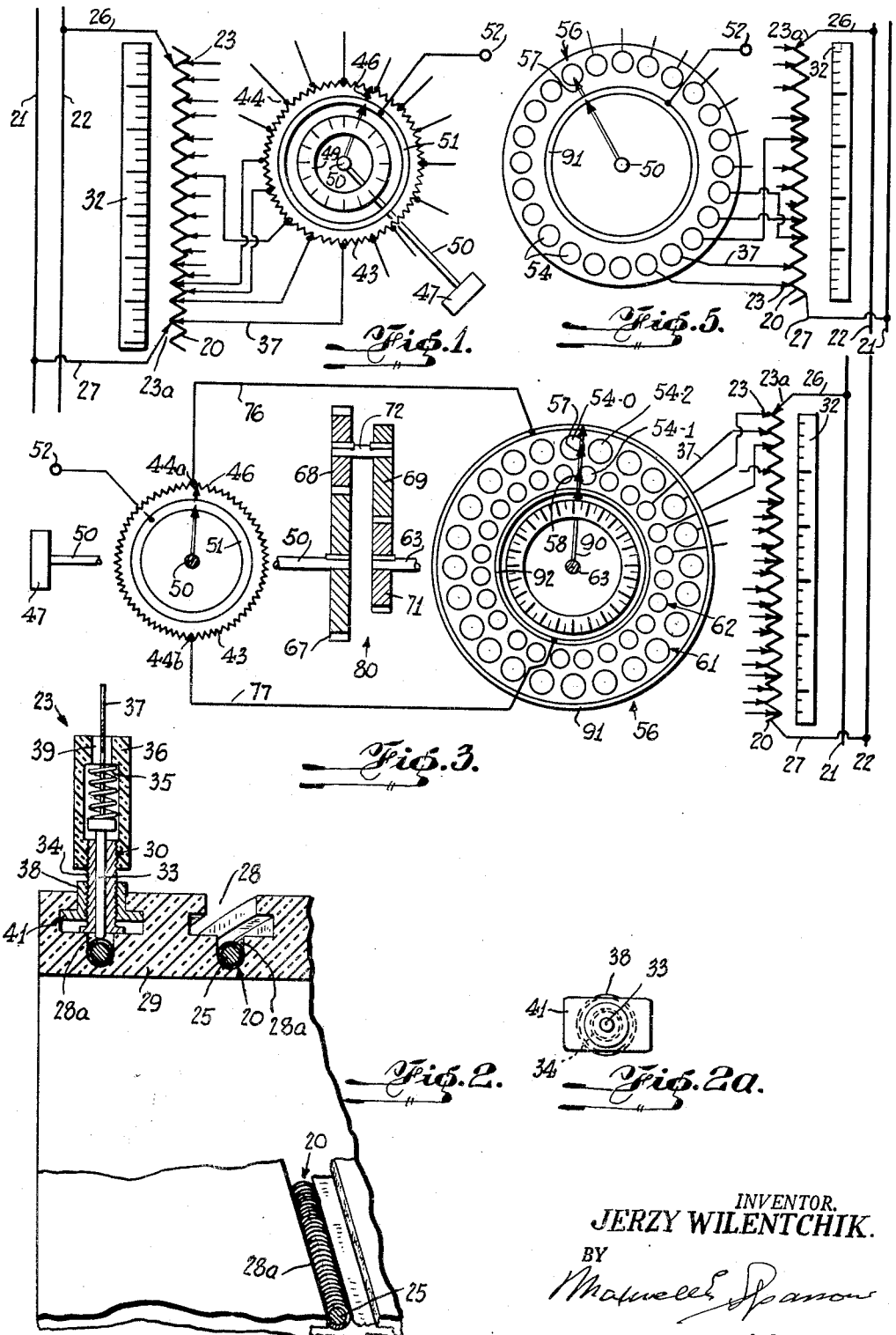
INVENTOR.
JERZY WILENTCHIK.
BY
ATTORNEY.

Dec. 8, 1953   J. WILENTCHIK   2,662,147
VARIFUNCTION POTENTIOMETER
Filed Aug. 24, 1950   2 Sheets-Sheet 2
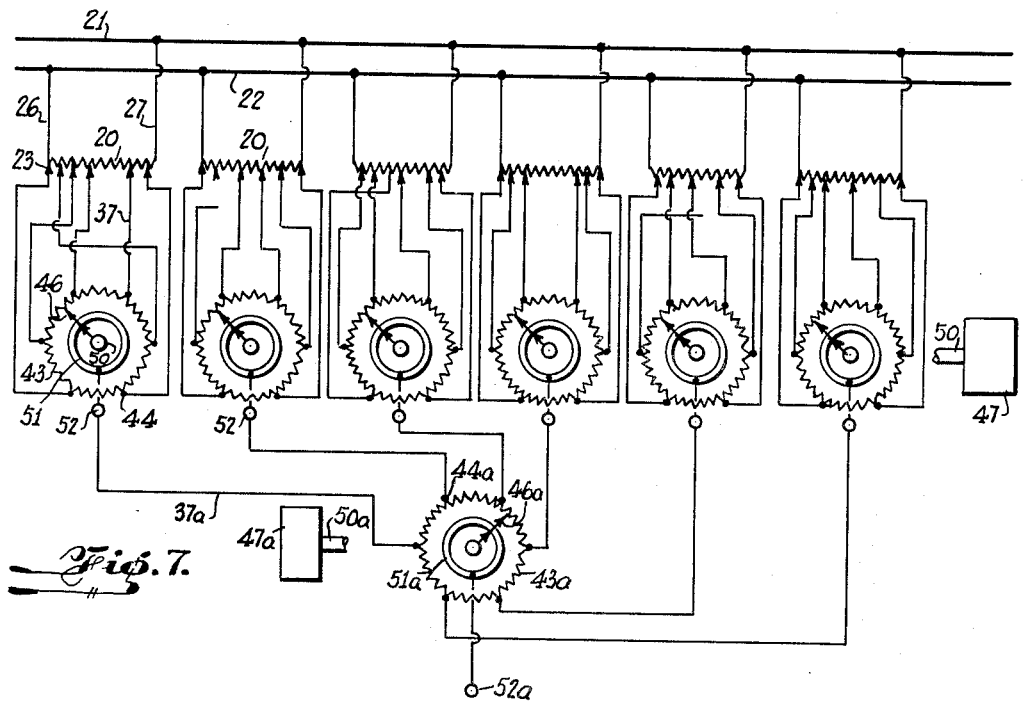
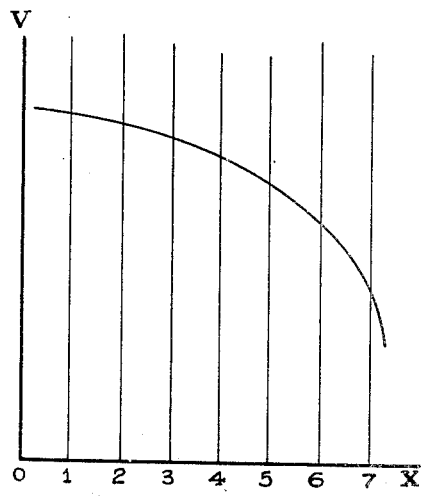
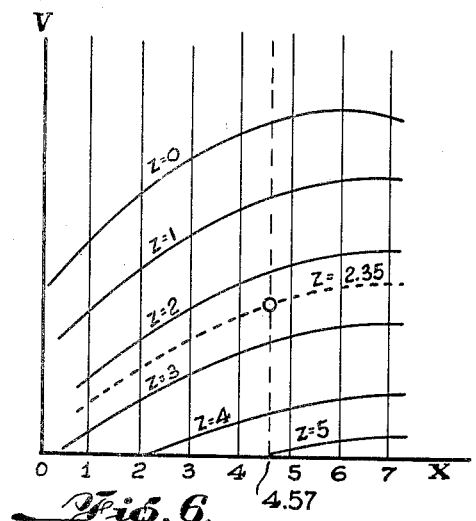
INVENTOR.
JERZY WILENTCHIK.
BY
ATTORNEY.

Patented Dec. 8, 1953

2,662,147

UNITED STATES PATENT OFFICE 2,662,147

VARIFUNCTION POTENTIOMETER

Jerzy Wilentchik, New York, N. Y.

Application August 24, 1950, Serial No. 181,255

27 Claims. (Cl. 201—48)

This invention relates to improvements in voltage generating systems, wherein it is desired to produce an output voltage "$v$" as a desired function $v=f(x)$ of displacement "$x$" of a single control member or as a function $v=f(x,z)$ of displacement "$x$" and "$z$" of a pair of independent control members.

An object of the invention is to provide a system of the aforementioned character in which the desired voltage functions can be set with extreme precision from data presenting the function in a tabular form, by shifting taps along a calibrated scale, or by measuring the amount of resistance between successive taps.

Another object of the invention is to provide means for adjustment of the total resistance of the veri-function potentiometer readily and manually.

The invention in all of its described modifications consists of a combination of components which are found and indicated hereinbelow and which are provided with numerals corresponding to the numerals used throughout the specification.

*Voltage divider.*—A multi-turn resistance coil arranged along the length of a groove in a non-conducting cylinder. Consists of a straight or a helically wound wire, and is indicated generally in the drawings by the numeral 23.

*Interpolating potentiometer.*—A single or multi-turn, spiral resistance winding provided with a pair or with more taps and with a wiping contact. Is indicated generally in the drawings by numeral 43.

*Selector switch.*—A generally circular array of stationary contacts connected to respective attachable taps and provided with one or more controlled wipers. Is indicated generally in the drawings by the numeral 56.

*Control shaft.*—Shaft of the interpolating potentiometer. Is indicated generally in the drawings by the numeral 50.

*Intermittent motion coupling.*—A gear coupling adapted to produce step displacements of selector switch wipers relative to rotation of the control shaft. Is indicated generally in the drawings by the numeral 80.

The one-variable instrument consists basically of the voltage divider resistance connected across a source of voltage and operating in conjunction with the interpolating potentiometer. Connections in parallel are made between preselected sectors on the interpolating potentiometer and the divider. Two modifications of the basic idea are presented. In the first one, those connections are permanent, in the second one they are intermittent, through use of the selector switch and of the intermittent motion coupling. The sectors are preselected manually by means of readily attachable taps. The output voltage function is obtained relative to the input shaft rotation. The slope of the output function can be changed by changing the location of the attachable taps.

The two-variable vari-function potentiometer operates on basically the same principle, except for provision of a plurality of elements instead of single elements used in the one variable instrument.

In general any functional voltage-displacement relationship $vf(x)$ can be simulated accurately by a sufficiently large number of potentials (referred to as setting potentials) on the curve of the function between which potential interpolations are being performed.

The magnitude "$v$" of respective setting potentials is indicated by voltage drops along the length of the divider 23, while the corresponding "$x$" values can be identified from a scale along the interpolating potentiometer 43. To set the instrument for a desired output voltage function, a plurality of setting points at a generally uniform "$x$" distance on the curve of the function is selected and their respective "$v$" values preset by a careful adjustment of the attachable taps.

For a better understanding of the invention, its advantages over the existing art and the specific objectives attained with its use, reference should be had to the accompanying drawings and to the following description in which preferred embodiments of the invention have been illustrated and described.

In the drawings:

Fig. 1 is a schematic representation of a one variable vari-function potentiometer according to the invention.

Fig. 2 is a partly broken, sectional and partly perspective view of the resistance mandrel and of the attachable tap.

Fig. 2a is a bottom view of the attachable tap seen in Fig. 2.

Fig. 3 is a schematic representation of a modification of the one-variable instrument according to the invention.

Fig. 4 is a representation of a single variable function $vf(x)$ in a $v$—$x$ plane.

Fig. 5 is a schematic representation of a modification of a one variable instrument according to the invention.

Fig. 6 is a representation of a two variable function $v=f(x,z)$ in a $v$—$x$ plane.

Fig. 7 is a schematic representation of a two-variable vari-function potentiometer according to the invention.

The description of the one variable vari-function potentiometer is as follows:

Referring to Figs. 1, 2 and 2a there is shown the divider 20 being connected to voltage supply mains 21 and 22, via a pair of attachable taps 23a and respective conductors 26 and 27. The resistance 20 comprises of a resistance wire helically wound on a heavily insulated copper core 25 and placed in a spiral groove 28a, the latter being cut centrally within a substantially T-shaped groove 28 in a Bakelite cylinder 29. For applications in which the input impedance of the potentiometer can be relatively low, straight slide wire without copper core 25 can be employed. A plurality of taps 23 substantially similar to the taps 23a can be attached manually at preselected locations along the length of the groove 28. The desired location of the taps 23 can be determined with the assistance of uniformly spaced divisions 32 imprinted along the length of the groove 28 or by checking the amount of resistance between successive taps 23.

The attachable tap 23 seen in Figs. 2 and 2a consists of a spring loaded contact 33 adapted to slide within an externally threaded bushing 34 against the pressure of a spring 35. The bushing 34 is linked operatively by means of a cemented and/or threaded joint at 30 to a Bakelite sleeve 36, the latter housing the spring 35. A flexible conductor 37 adapted for external connection is extended into the sleeve 36 via a hole 39 in the sleeve 36 and soldered to the contact 33. An internally threaded bushing 38 provided with a rectangular flange 41 is adapted to cooperate threadedly with the bushing 34. The flange 41 is dimensionally adapted to be inserted from without into the undercut section of the groove 28, but the longer side of the rectangular flange 41 is somewhat larger than the width of the undercut section of the groove 28 which prevents the rotation of the former within said groove. To attach a tap, the operator inserts the flanged bushing 38 at a desired location of the groove 28 and rotates the bushing 34 by means of the sleeve 36 until a sufficient locking pressure is produced between the flange 41, the bushing 34 and respective sections of the groove 28. Concurrently, a contact pressure is being produced between the contact 33 and the resistance winding 20.

While the basic idea explained with reference to Fig. 2 remains substantially the same, there are possible numerous modifications of the slot form and of design of the taps 23. Thus, the mandrel 29 must not necessarily be cylindrical, and the taps 23 can be attached by wedge effect or by spring pressure alone.

The conductors 37 connect to respective taps 44 on the interpolating potentiometer 43. The taps 44 can be welded or spring loaded. The winding 43 can be of several designs:

a. A circular winding with insulation gap between its extremities.

b. An electrically continuous winding without insulation gap.

c. A multi-turn coil substantially similar to the resistance 20.

To identify respective taps 44 on the winding 43, a scale 49 can be arranged along the length of the latter. In general, the spacing between the taps 44 is uniform, but can be made non-uniform if so desired. An output wiping contact 46 is adapted for displacement by the shaft 50, the latter being controlled by a suitable controlling means 47 (servo, hand wheel, thermostat). The travel distance can be indicated by a suitable indicating dia (not shown). The potential of the wiper 46 is transferred via a collector ring 51 to the output voltage terminal 52, which in turn can be connected to an external load circuit (amplifier, voltage indicator).

In a design modification of the arrangement in Fig. 1 (not shown), both the resistances 20 and 43 can be intercoupled mechanically and adapted for concurrent displacement by a control means 47, relative to wiper 46, instead of wiper 46 being rotated relative to the resistance 43. If the resistance 43 is a circular winding, the contact wiper 46 remains stationary while the resistances 20 and 43 are being rotated. If, on the other hand, the resistance 43 is a multi-turn spiral coil, the wiper 46 is adapted for displacement in a direction parallel to the axis of the former by a worm gear action, and can be displaced without breaking the electrical contact from one end of the winding 43 to the other end thereof, while the resistances 20 and 43 are being rotated.

It will be understood that there will be crossover connections of the conductors 37 only in functions $v=f(x)$ having both positive and negative slopes.

The description of the two variables V. F. P. is as follows:

Referring to Fig. 6 there is shown the general method of representing graphically a function of two variables $v=f(x,z)$ as a family of curves in a two dimensional plane $v$—$x$, $z$ being considered as a changing parameter adapted to assume fractional as well as integral values. In Fig. 6 only integral curves $z=0, 1, 2, 3, \ldots$ have been drawn.

The purpose of the instrument can be defined broadly as finding the voltage "$v$" for any desired combination of mechanical inputs "$x$" and "$z$" in conformance with the function $v=f(x,z)$. The basic principle can be clarified by way of an example:

Assuming, that it is desired to find the value of "$v$" for $x=4.57$, $z=2.35$ in Fig. 6, we would determine at first the location of the perpendicular $x=4.57$ in the plane $v$—$x$ by linear interpolation between $x=4$ and $x=5$. Next, we would find the location of $z=2.35$ on the line $x=4.57$ by a linear interpolation between $z=2$ and $z=3$ which gives a final value of "$v$."

This relatively simple method of solving a function of two variables $v=f(x,z)$ is followed closely by the two-variable vari-functional potentiometers.

Referring to Fig. 7, there is shown a plurality of dividers 20 provided with respective pluralities of attachable taps 23, the latter being connected via conductors 37 to respective taps 44 on interpolating resistors 43. The respective control shafts 50 can be mechanically intercoupled and controlled simultaneously by the "$x$" input means 47. The output terminals 52 are connected via respective conductors 37a to taps 44a on a single potentiometer winding 43a, the latter being controlled by "$z$" input means 47a. The winding 43 can be of several designs:

a. A circular winding with insulation gap between its extremities.

b. An electrically continuous winding without insulation gap.

c. A multi-turn coil substantially similar to the resistance 20.

The final output potential of the instrument is obtained from the terminal 52a.

The operation of the above described system is as follows:

The setting of taps 23 is such as to produce a desired output potential function "z" ($z$=0, 1, 2, 3, ...) at respective terminals 52 relative to displacement of the shaft 50. The wiper 46a interpolates between those potentials and produces an output potential function $v = f(x,z)$ at the terminal 52a.

It is apparent, that for fractional (non-integral) curves "z" in Fig. 6, the spacing of taps 44a will be proportionately non-uniform.

It will be understood that instead of using a plurality of respective resistors 20 and 43, a pair of single resistance windings could be used. Such an arrangement while simpler constructively may present greater difficulty when pre-setting the functional relationships into the instrument.

It will be further understood that each combination of resistances 20—43 could be substituted by a functional potentiometer of any conventional or commercially available type (tapered card, tapped, or engraved cylinder potentiometers), the other electrical connections remaining substantially similar to those in Fig. 7.

Referring to Fig. 3, there is shown a design modification of the one variable vari-function potentiometer employing a selector switch 56 and the intermittent motion coupling 80. The taps 23 of the divider 20 are connected via conductors 37 to respective bars 54 of the switch 56. The bars 54 are arranged in a pair of concentric arrays 61 and 62, the bars in each array being of the same size and spaced at an even distance from each other. (In Fig. 3 the bars in the array 61 are shown schematically larger than the bars in the array 62). A circular scale 60 provided with numbered graduations can be arranged along the circumference of the switch 56 to identify respective bars 54. A pair of wipers 57 and 58 insulated from each other and connected to a common displacing arm 90 are adapted to cooperate conductively with bars 54 in respective arrays 61 and 62 and with a pair of collector prints 91 and 92. The arm 90 is coupled operatively to a shaft 63 and is adapted for intermittent step displacement by an intermittent motion coupling 80, the latter consisting of a pair of meshing gears 67 and 68 coupled to respective shafts 50 and 72 and of a pair of intermittently engageable gears 71 and 69 coupled to respective shafts 63 and 72. The transmission ratio between the gears 67 and 68 is 2 to 1, the gear 69 is provided with a single shaped tooth and is referred to as the cam-gear and the number of teeth in the gear 71 is equal to the number of bars 54 in the commutator 56. Upon each revolution of the shaft 50, the cam-gear 69 engages the gear 71 and displaces the wipers 57 and 58 by half of the actual distance between a pair of consecutive bars in one of the arrays 61 or 62.

The wipers 57 and 58 are connected via collector rings 91 and 92, conductors 76 and 77 to respective taps 44a and 44b, the latter being arranged at 180 degrees from each other on an electrically continuous resistance coil 43. An output wiper 46 is linked operatively to the shaft 50 and adapted for displacemnt in conductive engagement with the coil 43 by the control member 47.

The operation of the system described with reference to Fig. 3 is as follows:

The potentials applied to the bars 54 in the ar-rays 61 and 62 identify the "v" values of the points, 0, 2, 4, 6 etc. and 1, 3, 5, 7 etc. respectively on the curve of the function $v = f(x)$. The points 0, 1, 2, 3, 4, etc. are spaced at a uniform distance from each other with reference to axis "x" as shown in Fig. 4. At the zero displacement position of the shaft 50, the wiper 46 will be situated opposite the tap 44a, the wiper 57 at the right hand extremity of the bar 54—0, and the wiper 58 at the left hand extremity of the bar 54—1. The direction of rotation of respective wipers 46, 57, and 58 is assumed in this example to be clockwise. As the wiper 46 is being displaced toward the tap 44b, its changing voltage represents interpolated potential values between the potentials of respective bars 54—0 and 54—1. Relative to the wiper 46 by-passing the tap 44b, the cam-gear 69 engages the gear 71 and displaces the wiper 57 towards the left hand extremity of the bar 54—1, and the wiper 58 towards the right hand extremity of the bar 54—1. Thus, as the wiper 46 is being displaced further towards the tap 44a, its potential varies gradually between the potentials of the bars 54—1 and 54—2. It will be understood, that the operation of the coupling 80 is repeated whenever the wiper 46 by-passes the tap 44a or 44b in whichever direction of rotation. Thus, a continuous output potential function is produced at the output voltage terminal 52 relative to the rotation of the shaft 50.

The higher the resistance ratio of the divider 43 to the potentiometer 20, the smaller would be the loading effect and the linearity of potential distribution along the length of the divider 20 will be preserved. This type of arrangement enables direct presetting of functional relationships according to scale 32 without resort to calculation and measuring instruments.

The total resistance of the vari-function potentiometer equals approximately to the resistance 20 and can be adjusted manually by connecting the supply taps 23a at desired points of the resistance 20. If for example, the taps 23a are connected across 5 turns of a 25 turn resistance coil 21, only one fifth of the total resistance length will be connected into the circuit. When a resistance adjustment is being thus made, the calibration of scale 32 must be changed proportionately.

To indicate the travel of the wiper 46, a dial (not shown) comprising a pair of scales, one to indicate the completed and the other the fractions of revolutions can be attached to the shaft 50.

It is understood that modifications of the arrangement in Fig. 3 are contemplated by this invention and which include:

a. Use of:

1. A single array of bars 54.
2. 1 to 1 gear transmission between the gears 67 and 68.
3. Electrically noncontinuous, circular resistance winding 46 provided with an insulated tap between a pair of closely spaced taps 44a and 44b.

b. Use of:

1. Triple array of bars 54.
2. 3 to 1 gear transmission between the gears 67 and 68.
3. Electrically continuous, circular winding 46 provided with 3 taps 120 degrees apart.

c. Use of modified forms of intermittent motion couplings based on cam action or on electromagnet action.

Referring to Fig. 5, there is shown schematically a modification of a single variable varifunction potentiometer adapted to be used in application in which only an approximate conformity of the output voltage to the desired function is required.

It consists basically of a selector switch 56 provided with a large plurality of bars 54, the latter being arranged circumferentially at an even distance from each other. Each bar 54 can assume a desired potential by being connected via a respective conductor 37 and an attachable tap 23 to the voltage divider 20. A wiper 57 is adapted to be displaced by a shaft 50 in conductive engagement with the bars 54 and with a collector ring 91. The width of the wiper 57 is slightly larger than the width of the insulation layer between a pair of consecutive bars 54. Thus, during the commutation of the wiper 57 between a pair of respective bars 54, the latter will be connected electrically via the body of the wiper 57. This had the general effect of short circuiting a sector of the divider 20, which in turn decreases the total resistance of the latter, increases the current flow and causes a departure of the output potential from a preset value. For functions having moderate slopes, the departure from the preset value will be relatively small and will decrease with the increase of number of bars 54. The output potential stays constant while the wiper 57 is moving along the length of a bar 54 and changes rapidly when the wiper 57 commutates. In this type of arrangement the change of potential is realized by steps, not by gradual variations, but can be satisfactory in many applications which do not require precision.

It is understood that the arrangement of Fig. 5 can be employed by suitably connecting the voltage supply legs in those applications in which it is desired to obtain a current output function (not a potential output function).

It will be further understood that all hitherto described embodiments of the vari-functional potentiometer can be used as adjustable non-linear elements in suitable follow up systems to control a motor driven load in accordance with a desired functional relationship.

While the invention has been described with reference to certain embodiments, it should be borne in mind that it is applicable not merely to resistance elements, but to all types of variable voltage sources comprising voltage division means provided with taps from which voltages of different magnitude, phase, frequency, etc. may be obtained and applied selectively to voltage interpolating means.

What I claim as novel and desire to secure by Letters Patent is:

1. In combination, a mandrel provided with a multi-turn, shaped groove, a voltage division means being arranged within said groove, a plurality of manually attachable contacts adapted to be attached conductively to said division means at preselected locations of said groove.

2. The combination according to claim 1, wherein said mandrel is provided with a scale arranged along the length of said groove.

3. In combination, a mandrel provided with a multi-turn shaped groove, a voltage division means disposed within said groove, and a plurality of manually adjustable contacts adapted to be attached fixedly to said division means at desired locations of said groove.

4. The combination according to claim 3, wherein said mandrel is provided with a linear scale along the length of said groove.

5. In combination, a mandrel having an undercut cavity, a plurality of flanged elements, locking means to lock said elements on said mandrel by means of said undercut cavity, and means to prevent the free turning of said flanged elements while being locked in position.

6. The combination according to claim 5, wherein said cavity is a multi-turn, undercut groove.

7. The combination according to claim 6, including a linear scale arranged along the length of said groove.

8. In combination, a non-conducting mandrel having a multi-turn groove, said groove having an undercut, a voltage division means disposed within said groove, a plurality of flanged elements, locking means to lock said elements on said mandrel at any desired point along said groove by means of said undercut, means to prevent the free turning of said flanged elements while being locked in position, and a plurality of contact taps in conductive engagement with said division means, said contact taps being operatively attached to said flanged elements.

9. The combination according to claim 8, wherein said division means is a resistance winding.

10. The combination according to claim 9 wherein said contact taps are spring loaded.

11. The combination according to claim 10, including a linear scale arranged along the length of said groove.

12. The combination according to claim 11, wherein the flange in said flanged elements is rectangular.

13. In combination, a non-conducting mandrel having a multi-turn groove, said groove having an undercut, first voltage division means disposed within said groove, a plurality of flanged contact elements, locking means to lock said contact elements on said mandrel in conductive engagement with said first division means at any point along said groove by means of said undercut, second voltage division means provided with a plurality of taps and with a wiping device adapted to be disposed along the length thereof, control means to dispose said wiping device, and conductor means to interconnect said flanged contact elements and said taps.

14. The combination according to claim 13, wherein the flange in said flanged elements is rectangular.

15. The combination according to claim 14, wherein said first and said second division means include respective resistance windings.

16. In combination, a resistance winding provided with a plurality of taps and with a wiping contact device, means to dispose said wiping contact device along the length of said resistance winding, a rotary selector provided with a plurality of contact points and with wiping means connected electrically to said taps, adjustable resistance means connected between respective contact points of said selector, and gear means to dispose said wiping means in conductive engagement with said contact points relative to displacement of said wiping contact device.

17. The combination, according to claim 16, wherein said plurality of contact points is arranged in a pair of symmetric arrays, said resistance winding being circular and electrically continuous, said taps being situated 180° apart on said winding, said gear means comprising an intermittent motion coupling adapted to produce step motion of said wiping means upon each 180° rotation of said wiping contact device.

18. The combination according to claim 17, wherein said adjustable resistance means comprises a resistance coil provided with a plurality of adjustable taps adapted to be electrically connected to said coil at a desired point thereof.

19. The combination according to claim 18, including a mandrel having a groove and an undercut in said groove, wherein said resistance coil is disposed within said groove, said adjustable taps being adapted to be locked at any point of said groove by means of said undercut.

20. The combination according to claim 19, including a linear scale imprinted along the length of said groove.

21. The combination according to claim 20, wherein said groove is a multi-turn helix.

22. In combination, a non-conducting mandrel having a multi-turn groove, said groove having an undercut, electrical impedance means disposed within said groove, a plurality of flanged contact elements, locking means to lock said contact elements on said mandrel in conductive engagement with said impedance means at any desired point along said groove by means of said undercut, a rotary selector provided with a plurality of contact points, and conductor means to interconnect said contact points with said flanged elements.

23. The combination according to claim 22, wherein the flange in said flanged elements is rectangular.

24. The combination according to claim 23, including a linear scale arranged along the length of said groove.

25. In combination, a plurality of non-linear voltage division means provided with respective wiping means, a first control means to dispose said wiping means in conductive engagement with said non-linear division means, a linear voltage division means provided with a wiping contact device and with a plurality of taps, conductor means to interconnect said taps and said wiping means, and second control means to dispose said wiping contact device in conductive engagement with said linear division means.

26. The combination according to claim 25, wherein each of said non-linear division means comprises a pair of resistance coils provided with respective fixed and adjustable tap means and conductor means to interconnect said respective fixed and adjustable tap means.

27. The combination according to claim 26, including a non-conducting mandrel having a groove, said groove having an undercut, wherein one of said resistance coils is disposed within said groove, said adjustable taps comprising respective contact elements adapted to be locked in position at any desired point of said groove by means of said undercut.

JERZY WILENTCHIK.

References Cited in the file of this patent

UNITED STATES PATENTS

| Number | Name | Date |
| --- | --- | --- |
| 1,038,342 | Gaylord | Sept. 10, 1912 |
| 1,351,019 | Boothman | Aug. 31, 1920 |
| 1,606,153 | Douglas | Nov. 9, 1926 |
| 2,439,857 | Millikan | Apr. 20, 1948 |
| 2,498,967 | Schaefer | Feb. 28, 1950 |
| 2,509,262 | Cohen | May 30, 1950 |
| 2,561,140 | Schaefer | July 17, 1951 |
| 2,572,545 | Walker | Oct. 23, 1951 |

FOREIGN PATENTS

| Number | Country | Date |
| --- | --- | --- |
| 56,943 | Germany | Sept. 25, 1890 |
| 212,089 | Great Britain | Mar. 6, 1924 |